United States Patent
Dickson et al.

(10) Patent No.: US 7,976,949 B2
(45) Date of Patent: Jul. 12, 2011

(54) HIGH STRENGTH CERAMIC ELEMENTS AND METHODS FOR MAKING AND USING THE SAME

(75) Inventors: Kevin R. Dickson, Hudson, OH (US); Walter T. Stephens, Cleveland, OH (US); Tihana Fuss, Marlborough, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 525 days.

(21) Appl. No.: 12/075,710

(22) Filed: Mar. 12, 2008

(65) Prior Publication Data

US 2008/0223574 A1    Sep. 18, 2008

Related U.S. Application Data

(60) Provisional application No. 60/906,464, filed on Mar. 12, 2007.

(51) Int. Cl.
*B32B 5/16*    (2006.01)
*B28B 1/00*    (2006.01)

(52) U.S. Cl. ......... 428/403; 428/404; 428/406; 501/153

(58) Field of Classification Search .......... 428/403–406; 501/153
See application file for complete search history.

(56) References Cited

U.S. PATENT DOCUMENTS

| | | | |
|---|---|---|---|
| 4,493,875 A | 1/1985 | Beck | |
| 4,632,876 A | 12/1986 | Laird | |
| 4,680,230 A * | 7/1987 | Gibb et al. | 428/403 |
| 4,788,080 A * | 11/1988 | Hojo et al. | 427/204 |
| 5,972,529 A | 10/1999 | Niwa | |
| 6,187,463 B1 | 2/2001 | Niwa | |
| 6,372,678 B1 * | 4/2002 | Youngman et al. | 501/128 |
| 6,780,804 B2 | 8/2004 | Webber | |
| 7,036,592 B2 * | 5/2006 | Nguyen et al. | 166/280.2 |
| 7,067,181 B2 * | 6/2006 | Burke | 428/34.4 |
| 7,491,444 B2 * | 2/2009 | Smith et al. | 428/402 |
| 7,615,172 B2 * | 11/2009 | Palamara et al. | 264/131 |
| 7,670,679 B2 * | 3/2010 | Krishna et al. | 428/403 |
| 7,678,723 B2 * | 3/2010 | Duenckel et al. | 501/127 |
| 7,867,613 B2 * | 1/2011 | Smith et al. | 428/403 |
| 2005/0096207 A1 | 5/2005 | Urbanek | |
| 2006/0177661 A1 | 8/2006 | Smith | |
| 2007/0075455 A1 | 4/2007 | Marini | |
| 2007/0166541 A1 * | 7/2007 | Smith et al. | 428/402 |
| 2010/0113251 A1 * | 5/2010 | San-Miguel et al. | 501/128 |

* cited by examiner

*Primary Examiner* — Hoa Le
(74) *Attorney, Agent, or Firm* — Stewart A. Fraser; Thomas G. Field, III

(57) ABSTRACT

One embodiment of the present invention relates to spherical ceramic elements, such as proppants, for maintaining permeability in subterranean formations to facilitate extraction of oil and gas therefrom. The strength of the ceramic element may be enhanced by combining materials having different coefficients of thermal expansion. Methods of making the ceramic elements are also disclosed.

14 Claims, 8 Drawing Sheets

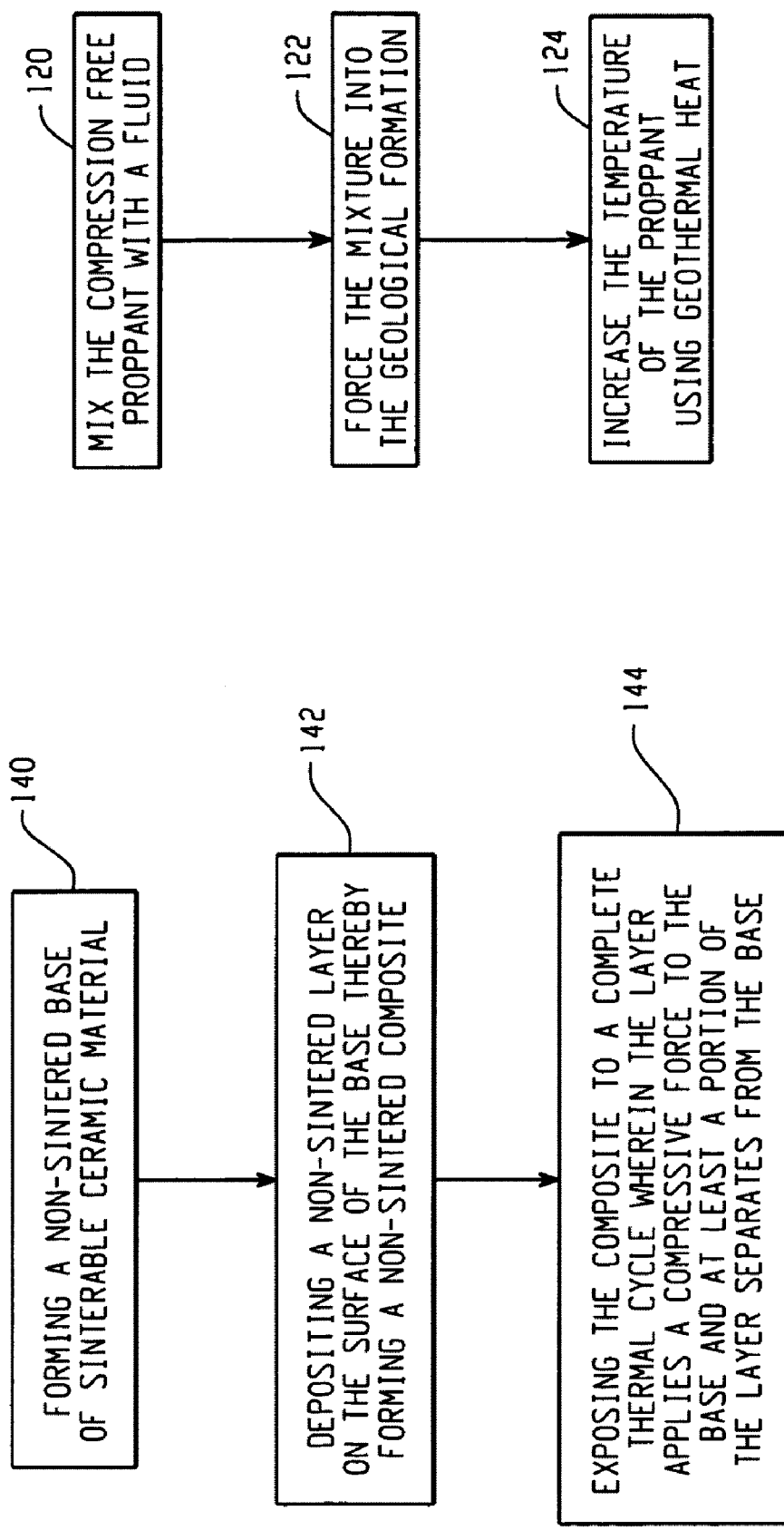

HIGH STRENGTH CERAMIC ELEMENTS AND METHODS FOR MAKING AND USING THE SAME

This application claims the benefit of U.S. Provisional Application No. 60/906,464, filed Mar. 12, 2007, and incorporated by reference.

BACKGROUND OF THE INVENTION

This invention generally relates to ceramic elements for use in a wide variety of industrial applications. Some of these applications include using the ceramic elements: as a proppant to facilitate the removal of liquids and/or gases from geological formations; as a media for scouring, grinding or polishing; as a bed support media in a chemical reactor; as a heat transfer media; and as a filtration media. More specifically, this invention is useful in applications that require a ceramic sphere that has high crush resistance. Even more specifically, this invention pertains to proppants that may be used in geological formations where the pressure exerted on the proppant exceeds the crush resistance of conventional proppants such as sand and resin coated sand.

Examples of patents and published patent applications directed to proppants include: U.S. Pat. No. 4,632,876; U.S. Pat. No. 7,067,445; and US 2006/0177661.

BRIEF SUMMARY OF THE INVENTION

In one embodiment, this invention may be a spherically shaped ceramic element comprising a sintered base secured to a sintered layer. The base has a coefficient of thermal expansion and the layer has a coefficient of thermal expansion. The base's coefficient of thermal expansion exceeds the layer's coefficient of thermal expansion. The base exerts a compressive force on the layer.

In another embodiment, this invention may be a process for manufacturing a ceramic element. The process may include the following steps. Forming a spherically shaped non-sintered base of sinterable ceramic material. Depositing a non-sintered layer of sinterable material on the surface of the base thereby forming a spherically shaped non-sintered composite having a base coated with at least one layer. Exerting a compressive force on the ceramic element by exposing the composite to a complete thermal cycle that includes a thermal ramp up phase and a thermal cool down phase. During the ramp up phase the base bonds and shrinks more than the layer. After the cool down phase the base exerts a compressive force on the layer.

In another embodiment, this invention may be a process for manufacturing a ceramic element. The process may include the following steps. Forming a spherically shaped non-sintered base of sinterable ceramic material. Depositing a non-sintered layer of sinterable material on the surface of the base thereby forming a spherically shaped non-sintered composite having a base coated with at least one layer. Exposing the composite to a complete thermal cycle comprising at least a first thermal ramp up phase and a final thermal cool down phase. After the initiation of the first ramp up phase the base shrinks and the layer applies a compressive force to the base. After the initiation of the final cool down phase at least a portion of the layer separates from the base.

In yet another embodiment, this invention may be another process for manufacturing a ceramic element. The process may include the following steps. Forming a spherically shaped non-sintered base of sinterable ceramic material. Heating the base to achieve at least partial sintering of the base. Depositing a non-sintered layer of sinterable material on the surface of the base thereby forming a spherically shaped composite having at least a partially sintered base coated with a non-sintered layer. Exposing the composite to a complete thermal cycle that exceeds the sintering temperatures of the base and layer. During the thermal cycle the base and layer bond to one another and contraction of the base exerts a compressive force on the layer.

The present invention may relate to a method of propping a geological formation. The method may include the steps of mixing a plurality of proppants with a fluid to form a flowable mixture and forcing the mixture under pressure into the geological formation until at least a portion of the proppants are disposed into cracks in the formation, wherein at least 5 weight percent of the proppants each comprises a sintered base secured to a sintered layer and the base exerts a compressive force on the layer.

The present invention may relate to another method of propping a geological formation. This method may include the steps of mixing a plurality of proppants with a liquid to form a flowable mixture. The proppant comprises a sintered base bonded to a sintered layer and the base exerts an initial force on the layer. Disposing the mixture under pressure into the geological formation until at least a portion of the plurality of proppants is inserted into fissures in the formation. Utilizing geothermal heat supplied by the geological formation to heat the proppants wherein the heat causes the exertion of a net compressive force on the layer and the net compressive force exceeds the initial force.

"Sintering", as used herein, means the joining of particles through the application of heat. This commonly results in densification, but not in all cases.

"Crush resistance" of a proppant is a term commonly used to denote the strength of a proppant and may be determined using ISO 13503-2:2006(E). A strong proppant generates a lower weight percent crush resistance than a weak proppant. For example, a proppant that has a 2 weight percent crush resistance is considered to be a strong proppant and is preferred to a weak proppant that has a 10 weight percent crush resistance.

BRIEF DESCRIPTION OF THE DRAWINGS

FIG. 8 shows the steps of a third process for manufacturing a proppant of this invention;

FIG. 9 shows the process steps for fracturing a subterranean formation; and

DETAILED DESCRIPTION OF THE INVENTION

The present invention provides a proppant with crush resistance that can be tailored for use in shallow wells, which are less than 500 m deep, intermediate wells, which may be between 500 m and 1500 m deep, or deep wells which are in excess of 1500 m below the surface of the ground. The proppant may be made from a combination of ceramic materials which can be selected to achieve maximum crush resistance.

The invention relates to proppants that are useful in increasing the output of oil and gas wells which may be located in porous and permeable subterranean formations. The porosity of the formation permits the formation to store oil and gas, and the permeability of the formation permits the oil or gas fluid to move through the formation. Sometimes the permeability of the formation holding the gas or oil is insufficient for economic recovery of oil and gas. In other cases, during operation of the well, the permeability of the formation drops to such an extent that further recovery becomes uneconomical. In such circumstances, it is common to fracture the formation, thereby creating cracks within the formation, and then force a suitable quantity of proppant into the cracks thereby holding them open so that the gases and liquids that would otherwise be trapped can readily flow through the cracks. Such fracturing is usually accomplished by using a hydraulic pump to force a gel-like fluid down a bore hole. The pressure is increased until cracks form in the underground rock. The proppants, which are suspended in this pressurized fluid, are forced into the cracks or fissures. When the hydraulic pressure is reduced, at least a portion of the proppant material remains in the cracks and functions to prevent the formed fractures from closing.

Figure 3:
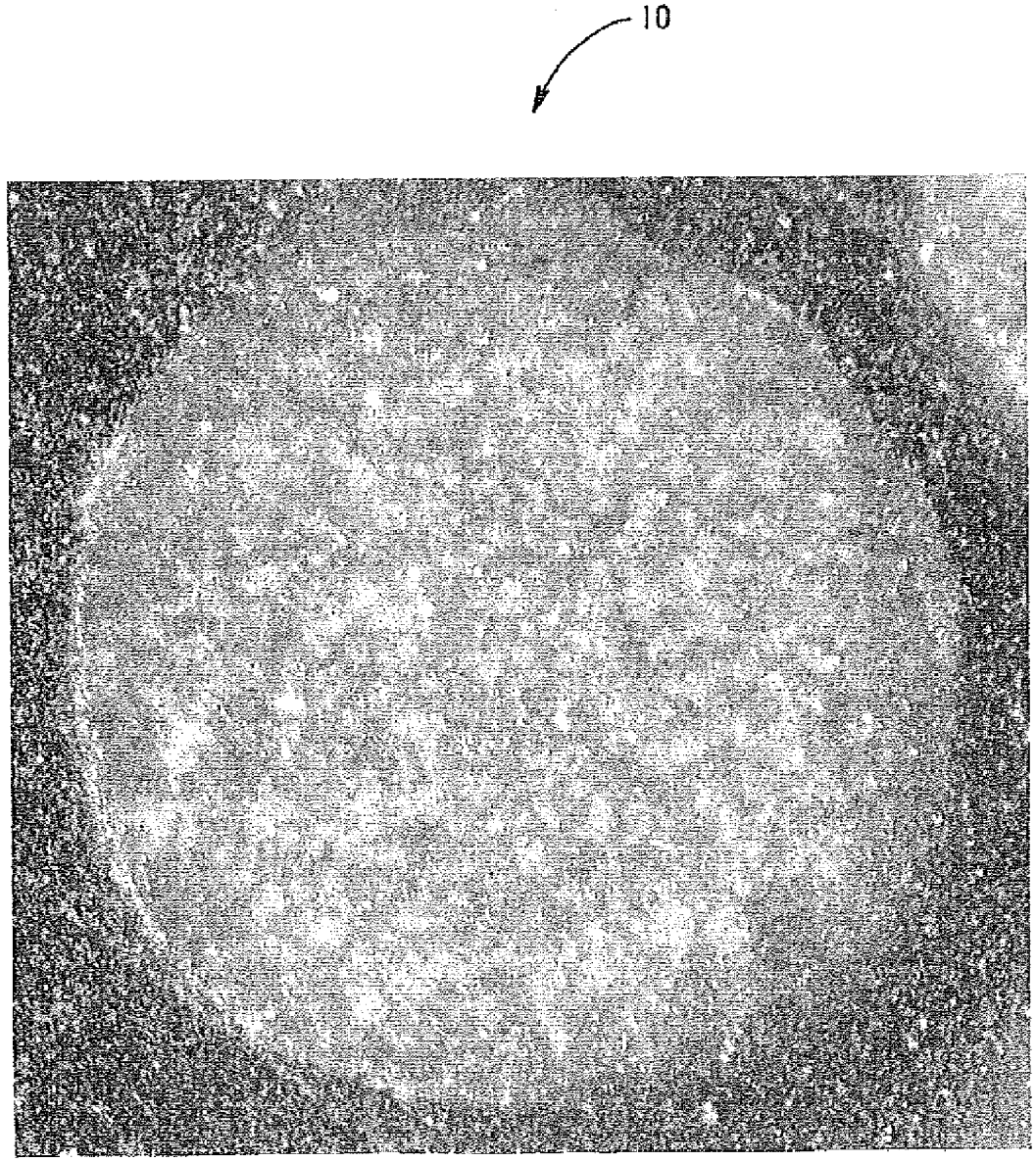
FIG. 3 is a photograph, magnified approximately 100 times, of a conventional proppant for comparison to a proppant of this invention.

Depending on the geological conditions, a wide variety of proppant materials may be used. Typically, proppants are particulate materials, such as sand, glass beads, or ceramic pellets, which create a porous structure. Shown in FIG. 3 is a photograph of a cross-sectional view of a conventional ceramic proppant 10 which is a generally spherical particle. The interstices between the particles allow the oil or gas to flow to collection regions. Pumps are used to move the oil or gas to the well head. Over time, the pressure of the surrounding rock tends to crush the proppants. The resulting fines from this disintegration tend to migrate and plug the interstitial flow passages in the propped structure. These migratory fines may drastically reduce the conductivity of the proppant which is a measure of the ease with which oil or gas can flow through the proppant structure and may be important to the productivity of a well. When the proppant's conductivity drops below a certain level, the fracturing process may be repeated or the well may be abandoned.

Ceramic proppants, sometimes called man-made proppants, are favored in certain applications over natural proppants, such as sand or resin-coated sand, due to the ceramic proppant's ability to withstand high pressures and temperatures and their resistance to corrosion. Despite being made of higher cost materials than natural materials, the improved crush resistance of ceramic renders the ceramic proppants suitable for conditions which are too severe for other materials, e.g., at rock pressures above about 350 kg/cm$^2$ (5,000 psi). As pressure increases with depth, ceramic proppants are commonly used at depths of about 1500 meters below the earth's surface, or more. They are typically formed by combining finely ground material, such as clay, bauxite, or corundum, with water and then mixing in a rotary mixer. Blades in the mixer cause the wet mixture to form generally spherical pellets, which upon drying and sintering at high temperature are of the general particle size desired. Pellets which fall outside the desired range are returned to the mixer after the drying stage to be reworked.

Proppants may be generally classified into one of three grades: light weight proppants (LWP), intermediate grade proppants (IP), and high strength proppants (HSP). Light weight proppants are suitable for use over a range of closure stress from less than about 1000 psi to about 7500 psi, while intermediate grade proppants are useful up to about 12,000 psi, and high strength proppants can be used at pressures in excess of 12,000 psi. Attempts to improve conductivity have focused on methods of improving crush resistance of the proppants. One method includes the application of coatings. While measurable improvements in conductivity have been obtained, for example, by applying a resin coating, such improvements have associated increases in cost.

The present invention achieves the goal of producing a proppant having desirable crush resistance by selecting material combinations and processing steps that result in the exertion of a net compressive force on the proppant's layer by the proppant's base. Providing a proppant having desirable crush resistance due to the creation of a net compressive force on the layer by the base requires significant knowledge, skill and a previously unidentified appreciation of how material selection and proppant design may be coordinated to produce a proppant having certain desired characteristics. In addition to crush resistance, properties such as permeability, chemical compatibility, particle size distribution, availability of raw materials and processing limitations may be considered when specifying a proppant. From the wide array of options available to proppant manufacturers, the inventors have identified and described below the material properties, proppant design criteria and processing steps that may be brought together to produce a proppant of this invention.

In one embodiment of a ceramic element of the present invention, such as a proppant, sinterable materials having different coefficients of thermal expansion may be used to create a proppant having a base that exerts a compressive force on the proppant's layer. The compressive force exerted on the layer by the base increases the crush resistance of the proppant. As will be explained, the compressive force exerted on the proppant can be produced using a kiln to expose the unfired base and layer to at least one complete thermal cycle, or, alternatively, the heat transferred to the proppant may be provided by the geological formation when the proppant is disposed downhole into a well. As used herein, "a complete thermal cycle" includes an initial temperature, at least an initial ramp up phase, at least a final cool down phase and a final temperature that is equal to or less than the initial temperature. A complete thermal cycle may also include: a thermal holding phase between the initial thermal ramp up phase and the final cool down phase during which the temperature of the proppant is not intentionally increased or decreased; one or more additional ramp up phases; and one or more additional cool down phases. Factors that can impact the formation of a proppant of this invention may include: the chemistry of the proppant's raw materials; the microscopic phase or phases that exist within the proppant after sintering, the physical relationship of the base to the layer; and the process steps used to make the proppant.

In a first embodiment of a process for making a proppant of this invention, a plurality of spheroids of sinterable material having a known coefficient of thermal expansion are produced. These spheroids, which may be individually identified herein as an "inner base" or "base" and collectively referred to as "bases", are similar to commercially available proppants. A layer of sinterable material, which may be physically and/ or chemically and/or crystallographically distinct from the base material, may be disposed on the surface of the spheroid shaped base thereby forming a nonsintered layer of sinterable material on the surface of the non-sintered base material which may be collectively referred to herein as a proppant precursor. The layer has a coefficient of thermal expansion less than the base material's coefficient of thermal expansion. The precursor may then be heated above the minimum temperature needed to bond the base to the layer and sinter both the base and the layer. As the bonded and sintered composite cools down, the base responds to the reduction in temperature by attempting to shrink more than the layer shrinks which results in the base exerting a compressive force on the layer. The compressive force improves the proppant's crush resistance.

The improvement in the crush resistance of the proppant may be influenced by several variables that include product characteristics and/or processing steps and combinations of the same. For example, the difference between the base material's coefficient of thermal expansion and the layer material's coefficient of thermal expansion may be used to cause stresses in ceramic components. Selecting combinations of materials that have complimentary coefficients of thermal expansion and then processing them in a manner that imparts a desirable compressive force on the layer material requires skill and knowledge. Another product characteristic is the shrinkage of the base material and the layer material due to densification during the sintering process. While densification of ceramic materials due to sintering is well known, how to select combinations of a base material and a layer material that results in the exertion and maintenance of a compressive force on the sintered proppant's layer by the base is not fully appreciated in the art. With regard to processing steps and, in particular, during the sintering process, the difference between the temperatures at which the base material and layer material begin to shrink (start of shrinkage) and stop shrinking (termination of shrinkage) may favorably influence or negatively impact the generation of the desired compressive force on the layer by the base. Furthermore, during the latter portion of the sintering process, the difference in the base material's and the layer material's rates of linear change versus temperature can be used to exert a compressive force on the layer. When a proppant precursor is sintered, both the sinterable base and sinterable layer may be densified. The sintering process can reduce the porosity of the material which may reduce the volume occupied by the material. Non-reversible sintering causes non-reversible shrinkage of the material. In contrast, the repeated expansion and contraction of a material in response to increases and subsequent decreases in the temperature of the material may be a repeatable, reversible and material specific phenomenon that defines the material's coefficient of thermal expansion. The shrinkage of a ceramic material due to densification and the shrinkage of the same material due to the coefficient of thermal expansion can be treated as independent from one another and may be coordinated to achieve the desired compressive force on the layer.

Figure 1:
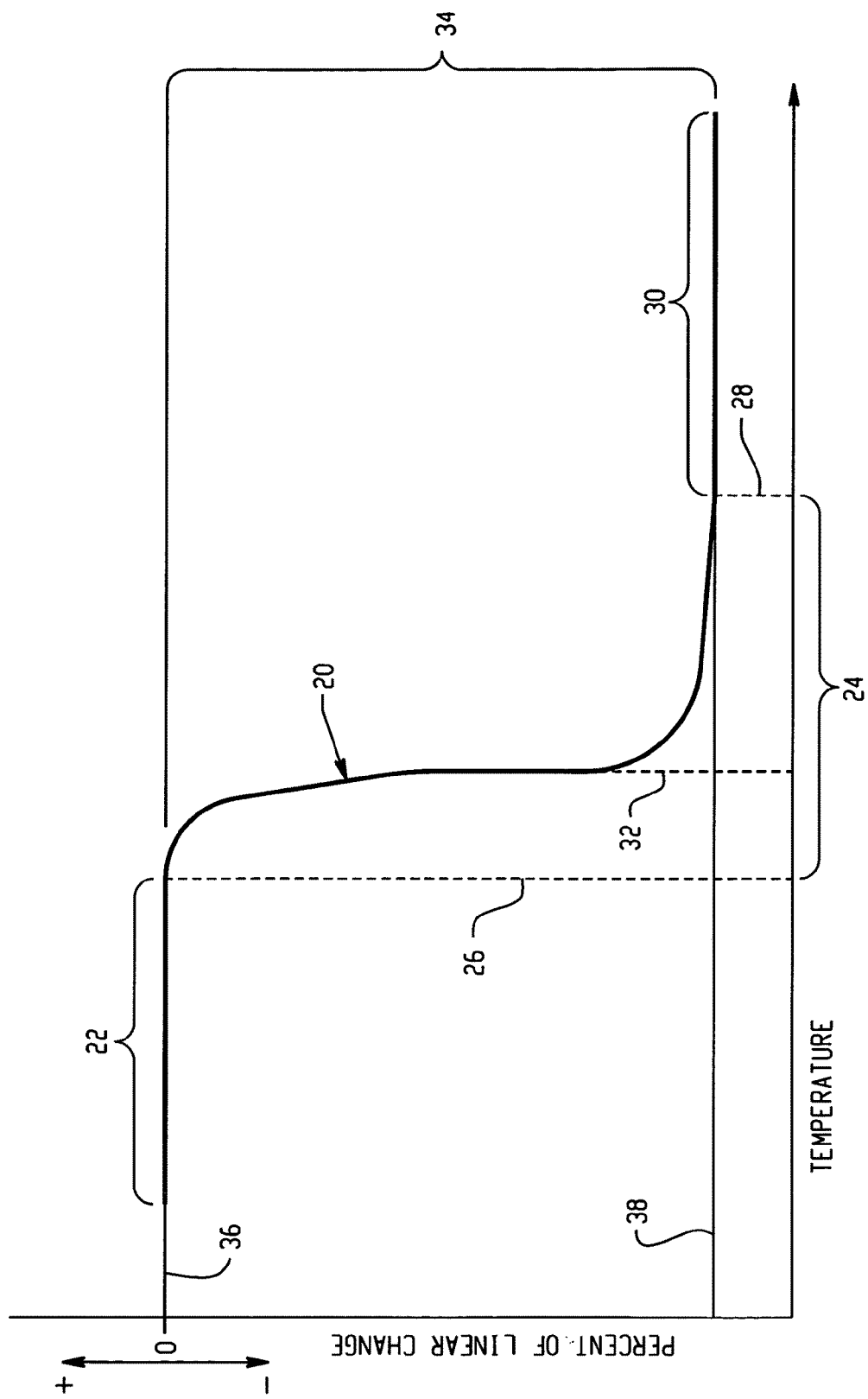
FIG. 1 shows a hypothetical plot of percent linear change versus time for a homogenous material.

As will now be explained, the relationship between the sintering profiles of the base material and layer material may be one of the characteristics used to select material combinations that will generate a compressive force on the layer. Shown in FIG. 1 is an exemplary graph where the percent of linear change (PLC) is plotted versus temperature for a hypothetical material that could be used to form a proppant. While this graph illustrates a single step sintering curve, multiple step sintering curves, such as a two step curve or a three step curve, are possible. The percent of linear change may be determined using dilatometry. A commercially available dilatometer is an Anter model 1161. Sintering profile 20 includes a first region 22 where the length of the material remains essentially unchanged as the temperature of the material is increased. The second region 24 of the sintering profile is defined by a first temperature 26 at which the material starts to shrink and a second temperature 28 at which the shrinkage terminates. The third region 30 of the sintering profile begins at temperature 28 and represents the region where material no longer shrinks despite further increases in the material's temperature. Temperature 26 indicates the start of shrinkage and temperature 28 indicates the termination of shrinkage. Temperature 32 represents the material's nominal sintering temperature which may be determined by identifying the point on the curve where the material has achieved 50% of the amount of shrinkage disclosed by the curve and then determining the temperature at which the 50% shrinkage was achieved. The total amount of shrinkage 34 is represented by the difference between the value of the starting linear dimension 36 and the value of the final linear dimension 38.

Figure 2:
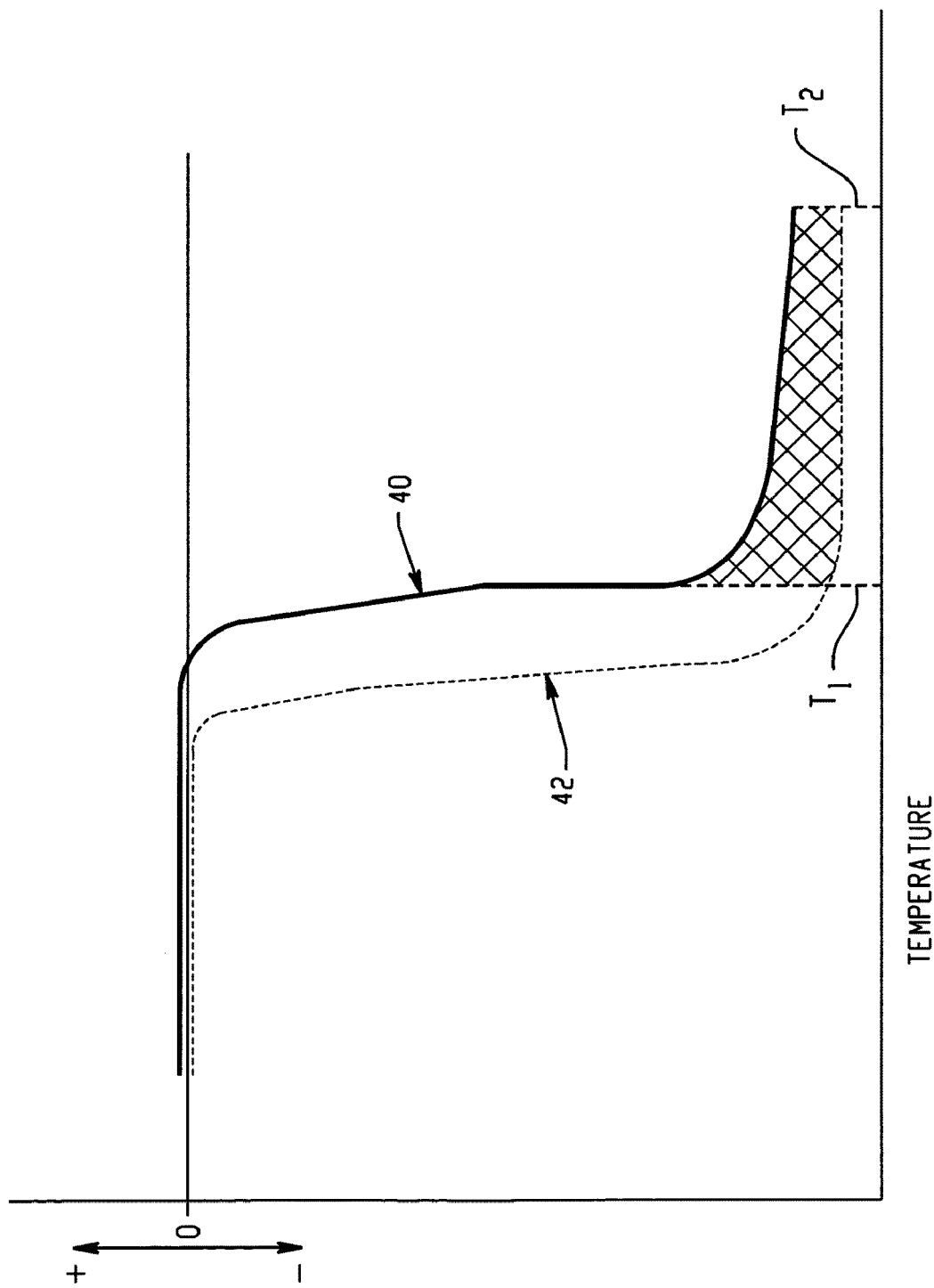
FIG. 2 shows hypothetical plots of percent linear change versus time for two materials.

Shown in FIG. 2 is an exemplary graph of two sintering profiles from a hypothetical base material 40 and a hypothetical layer material 42. In this example, when the proppant has reached the final stage of sintering, which is defined for use herein as the region between temperature $T_1$ and $T_2$ as shown in FIG. 2, the rate of linear change in the layer material is less than the rate of linear change in the base material. Consequently, as the temperature of the proppant is increased from $T_1$ to $T_2$ the base shrinks more than the layer. If the base is adequately bonded to the layer, then the base effectively tries to pull the layer inwardly toward the center of the proppant thereby exerting a compressive force on the layer. The cross-hatching in FIG. 2 represents the difference in the rates of linear contraction versus temperature. If this difference in the rates of linear contraction is too small, then there will be no compressive force exerted on the layer. If the difference in the rates of linear contraction is too large, the base may pull away from the layer thereby effectively delaminating the layer from the base. Furthermore, if the difference in nominal sintering temperature is too small, such as less than 5° C., or too large, such as greater than 250° C., then the base may not be able to exert a compressive force on the layer. Depending upon the composition of the base material and layer material a difference in nominal sintering temperatures between 20° C. and 150° C. may be desirable.

The absolute difference between the coefficients of thermal expansion may be between 1% and 40% of the base's coefficient of thermal expansion. In some embodiments, the absolute difference between the coefficients of thermal expansion may be between 5% and 30% of the base's coefficient of thermal expansion. Proppants that experience delamination of the layer may have reduced strength and their effectiveness as a proppant may be diminished.

To illustrate some embodiments of the invention described herein, various combinations of sinterable base material and sinterable layer material will now be described. In a first scenario, if the shrinkage of the base due to sintering is greater than the shrinkage of the layer due to sintering and the base is bonded to the layer, then the base may exert a compressive force on the layer. If, at the same time, the base material's coefficient of thermal expansion is greater than the layer material's coefficient of thermal expansion, then the difference in coefficients of thermal expansion further increases the compressive force exerted on the layer. In a second scenario, if the shrinkage due to sintering of the base and layer are essentially equal and the base material's coefficient of thermal expansion is greater than the layer's coefficient of thermal expansion, then the compressive force exerted on the layer may be due solely to the difference in coefficients of thermal expansion. In a third scenario, if the coefficients of thermal expansion of the base and layer are essentially the same and the shrinkage of the base due to sintering is greater than the shrinkage of the layer due to sintering, then the compressive force exerted on the layer may be due solely to the difference in shrinkage caused by the sintering. In a fourth scenario, the layer's coefficient of thermal expansion is greater than the base's coefficient of thermal expansion and the shrinkage of the layer caused by sintering may be greater than the shrinkage of the base caused by sintering. A proppant having these physical characteristics may or may not experience a net compressive force when functioning as a proppant in a downhole application. For example, a proppant having the characteristics described above in the fourth scenario may experience a compressive force on the layer when the temperature of the proppant is elevated, such as when the proppant is disposed into a geological formation where a source of geothermal heat can increase the temperature of the proppant. In a fifth embodiment, the shrinkage of the base due to sintering is less than the shrinkage of the layer due to sintering and the base material's coefficient of thermal expansion is greater than the layer's coefficient of thermal expansion. In a sixth embodiment, the shrinkage of the base due to sintering is greater than the shrinkage of the layer due to sintering and the layer material's coefficient of thermal expansion is greater than the base material's coefficient of thermal expansion. In the fifth and sixth embodiments, the specific characteristics of the proppant and the processing conditions used to make the proppant may be coordinated to exert a net compressive force on the layer.

Some of the proppant's characteristics that may be used to influence the existence and/or amount of compressive force exerted on the layer are the diameter of the base and the thickness of the layer. In turn, the diameter of the base and the thickness of the layer may be impacted by the raw materials used to make the base and layer. If the difference in the coefficients of thermal expansion is large, the diameter of the base may be minimized and the thickness of the layer may be maximized so that the shrinkage of the base does not cause the layer to crack and buckle inwardly thereby reducing the proppant's crush resistance. However, if the difference in the coefficients of thermal expansion is small, the diameter of the base may be maximized and the thickness of the layer minimized so that the shrinkage of the base can exert sufficient compression of the layer to adequately improve the proppant's crush resistance. The average thickness of the layer may be between 5% and 50% of the proppant's average radius. Layer thickness between 10% and 25% of the proppant's average radius may be desirable.

The physical characteristics of the base and layer may also influence the creation of a net compressive force on the layer. For example, if the base includes particles having an average particle size that exceeds the average particle size of the layer's particles, the difference in average particle size may increase the net compressive force on the layer by the base.

Determining the existence of a compressive force on a proppant's layer may be determined directly or indirectly. The indirect method requires the determination of the base material's coefficient of thermal expansion and the layer's coefficient of thermal expansion prior to making the proppant. The coefficients of thermal expansion may be determined using an analytical technique known as dilatometry to plot changes in both the base material's and the layer material's length versus changes in temperature. The changes in length versus temperature of the raw materials determine the materials' coefficients of thermal expansion. If the layer's coefficient of thermal expansion is less than the inner base's coefficient of thermal expansion, then the base may exert a compressive force on the layer In comparison to the indirect method, the direct method uses diffraction patterns generated by X-ray diffraction (XRD) or transmission electron microscopy (TEM) to determine whether or not the layer is in compression. This determination is accomplished by measuring the atomic spacings of certain atoms in the layer and then comparing these atomic spacings, also known as "d-spacings", to the atomic spacings of control materials that are not in compression. If the d-spacings of the atoms in the layer are at least one percent less than the comparable d-spacings in the control material, then the layer may be in compression. The amount of compression may be proportional to the difference in d-spacings between the proppant and the control material.

Figure 4:
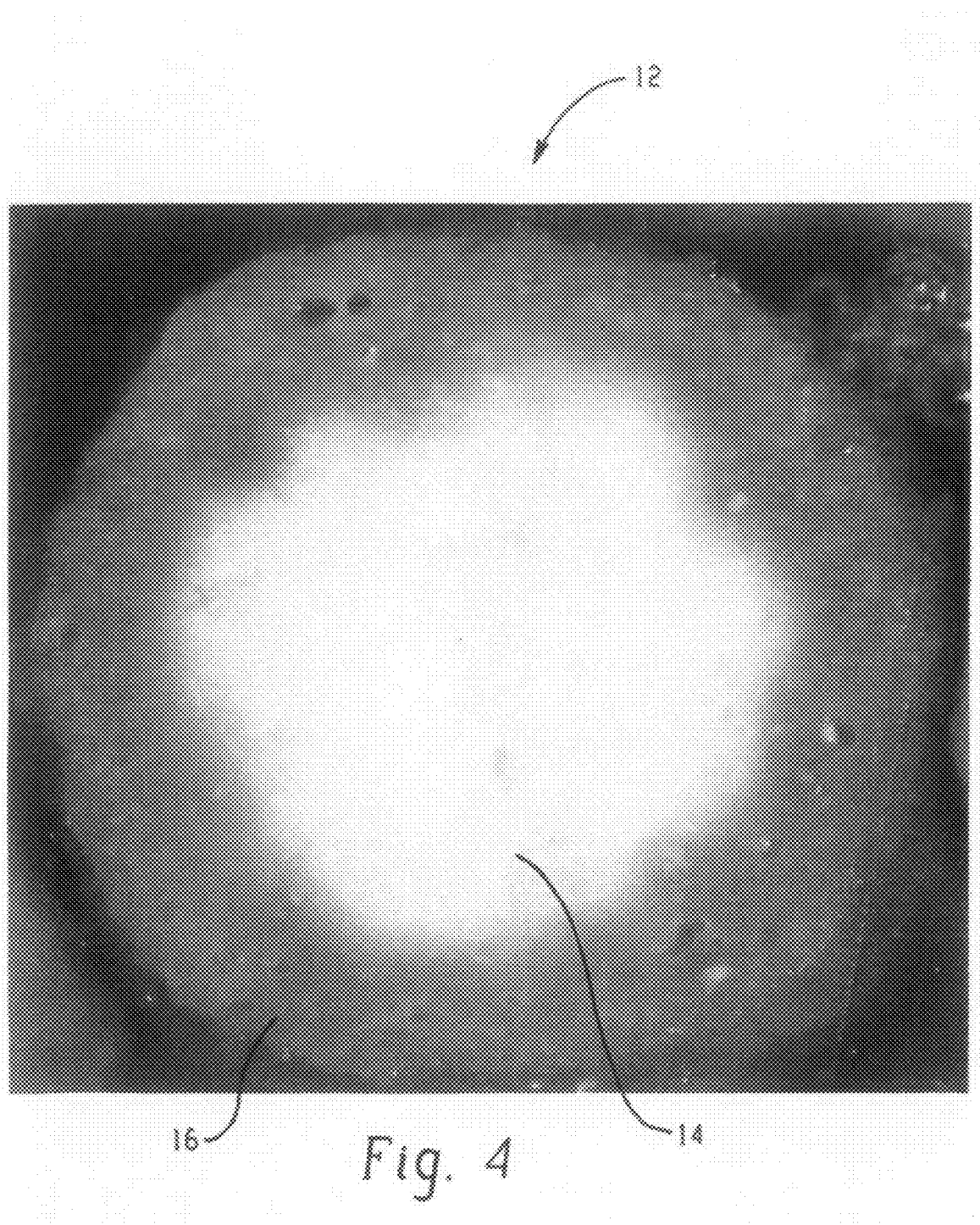
FIG. 4 is a photograph, magnified approximately 150 times, of a first embodiment of a proppant of this invention.

Referring now to the drawings and more particularly to FIG. 3, there is shown a magnified photograph of a cross-sectional view of a conventional ceramic proppant 10 which may be a generally spherical particle. The proppant includes a mixture of sinterable compounds that have been mixed with one another, formed into spheroids and then sintered in a complete thermal cycle thereby forming a plurality of free flowing particles. Suitable sinterable compounds include alumina, titania, silica, magnesia, mullite, talc, forsterite, iron oxide, clay, bauxite and aluminosilicates Referring now to FIG. 4, there is shown a magnified photograph of a cross-sectional view of a first embodiment 12 of a ceramic proppant of this invention. Proppant 12 comprises base 14 onto which layer 16 has been deposited and bonded. The base may be referred to herein as the core of the proppant. The layer, which may be described herein as a shell, forms a hard protective coating on the surface of the base due to the compressive force exerted on the layer by the base. While a continuous layer that encapsulates base 14 may provide the proppant with the best crush resistance, a discontinuous layer may be feasible. A discontinuous layer may have one or more openings therethrough. The size, shape, and location of the openings may not cause a significant reduction in the proppant's crush resistance relative to a proppant having a continuous layer.

Figure 5:
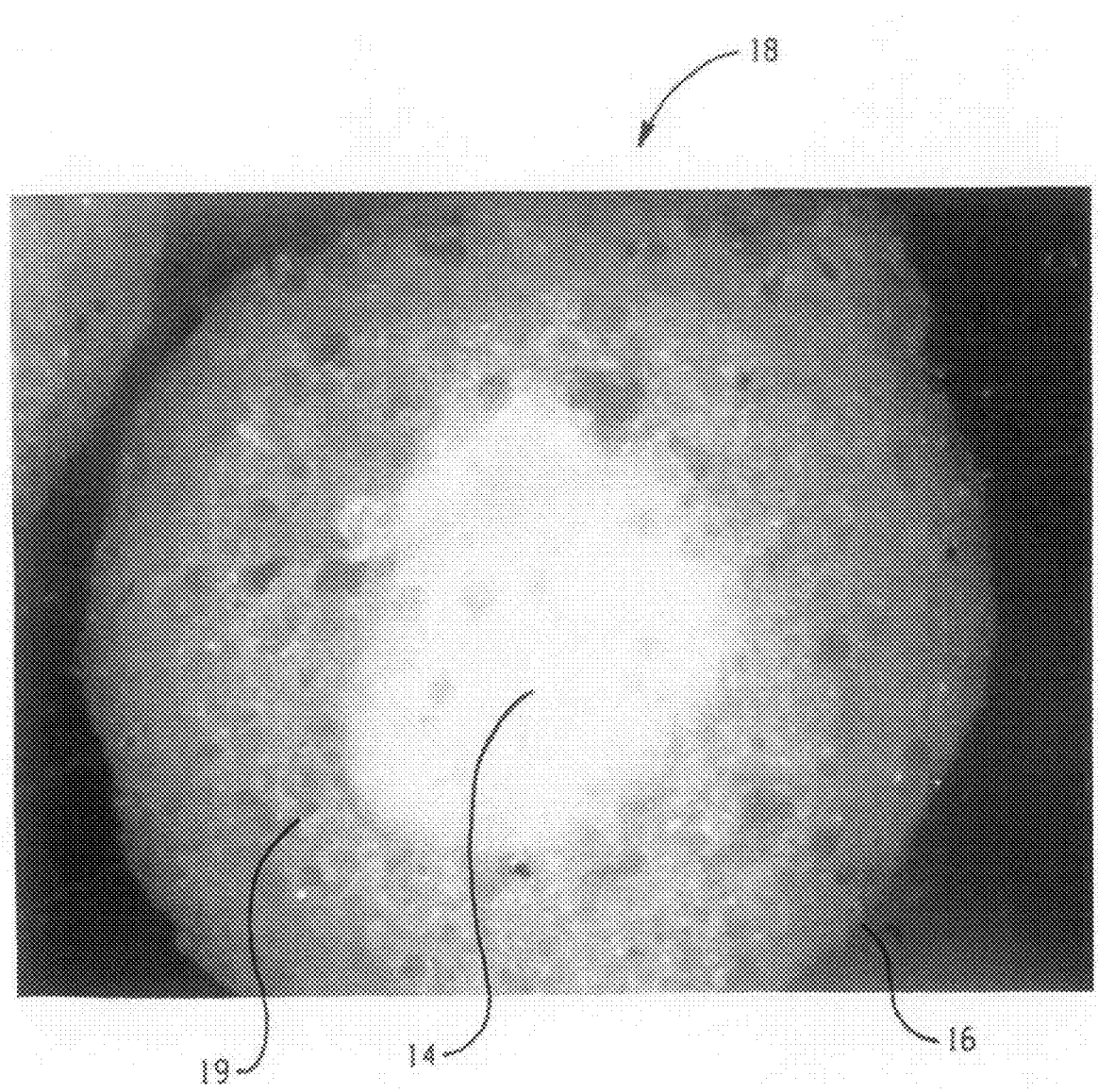
FIG. 5 is a photograph, magnified approximately 120 times, of a second embodiment of a proppant of this invention.

Shown in FIG. 5 is a magnified photograph of a cross-sectional view of a second embodiment 18 of a ceramic proppant of this invention. Similar to the proppant shown in FIG. 4, the proppant shown in FIG. 5 has a base 14 and an layer 16. However, in contrast to the proppant shown in FIG. 4, the proppant shown in FIG. 5 has intermediate layer 19 between the base and layer. The intermediate layer may function as a bonding layer between the base and layer. The use of a bonding layer may be useful when the base and layer cannot be readily bonded to one another.

Figure 6:
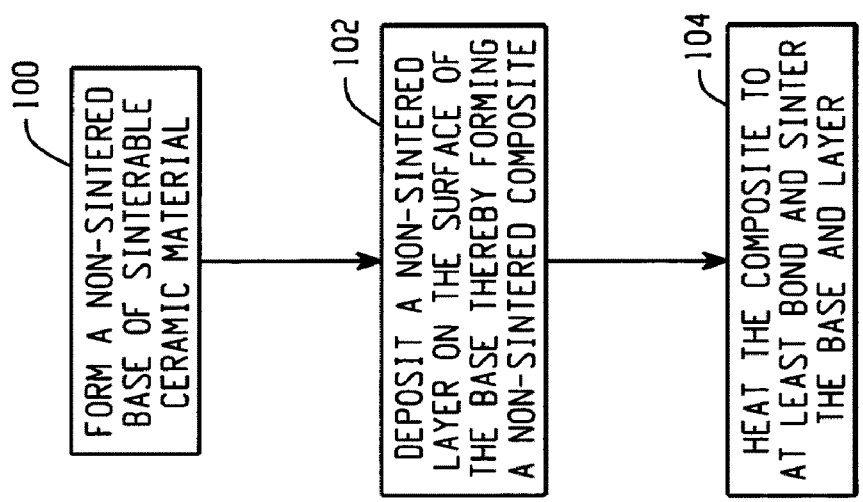
FIG. 6 shows the steps of a first process for manufacturing a proppant of this invention.

FIG. 6 discloses the steps in a first embodiment of a process for making ceramic proppant of this invention. In step 100, a plurality of non-sintered bases, made of sinterable ceramic material, may be formed. In step 102, a non-sintered layer of sinterable material may be deposited on the surface of the base thereby forming a proppant precursor. Step 104 represents heating the precursor in a single thermal cycle to at least the minimum temperature needed to bond and sinter the base and layer and then cooling the bonded base whereby the base exerts a compressive force on the layer.

Figure 7:
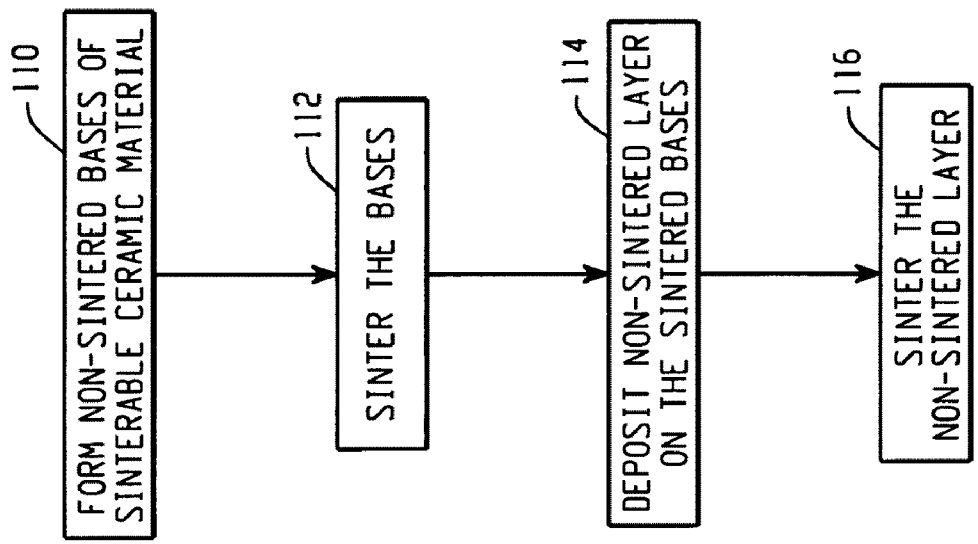
FIG. 7 shows the steps of a second process for manufacturing a proppant of this invention.

FIG. 7 discloses the steps in a second embodiment of a process for making ceramic proppant of this invention. In step 110, a plurality of non-sintered bases, made of sinterable ceramic material, may be formed. Step 112 represents sintering and then cooling the bases in a first thermal cycle. The bases have a maximum theoretical density that may be calculated. The bases may be densified as needed to achieve the physical integrity needed. Densification of the bases to at least 25% and less than 75% of the base material's maximum theoretical density is feasible. Step 114 represents depositing a layer of non-sintered material on the sintered bases. Step 116 represents sintering of the non-sintered layer in a second thermal cycle. The sintering temperature in step 116 may be at least 25° C. greater than the sintering temperature in step 112.

FIG. 8 discloses the steps in a third embodiment of a process for making ceramic proppant of this invention. In step 140, a plurality of non-sintered bases, made of sinterable ceramic material, may be formed. In step 142, a non-sintered layer of sinterable material may be deposited on the surface of the base thereby forming a composite having a base coated with at least one layer. Step 144 represents exposing the composite to a complete thermal cycle that includes a first thermal ramp up phase and a final thermal cool down phase. After initiation of the first ramp up phase the base shrinks and the layer applies a compressive force to the base. After the initiation of the cool down phase and prior to the separation of the layer from the base, the layer may temporarily exert an additional compressive force on the base. Ultimately, after the initiation of the final cool down phase at least a portion of the layer separates from the base which potentially exposes the base to direct contact with an adjacent proppant.

The process disclosed in FIG. 8 generates a crush resistant proppant by utilizing the layer to exert a compressive force on the base after the initiation of the first thermal ramp up phase and then relying upon stress imparted to the layer during the thermal cycle to fracture the layer which leads to the removal of at least a portion of the layer. The application of a compressive force on the base by the layer may be caused by sintering of the layer and/or by the difference between the base's and layer's coefficients of thermal expansion. Applying a compressive force to the base is believed to improve the strength and thus the crush resistance of the base. Regardless of the reasons for the shrinkage of the layer, if the layer applies a compressive force to the base then the layer may be in tension. The separation of the layer from the base may be caused by the layer having a higher coefficient of thermal expansion than the base. Separation of the layer from the base may occur during or after the cool down phase. If at least a portion of the layer spontaneously fractures after the initiation of the cool down phase, the fractured portion may readily fall away from base. Additional portions of the layer may separate from the base if a plurality of proppants are tumbled or exposed to ultrasonic vibration. The amount of layer that separates from the base may be proportional to the amount of stress applied to the layer which may be proportional to the difference in the base's and layer's coefficients of thermal expansion. While the difference in coefficients of thermal expansion needed to separate the layer from the base may vary with thickness of the layer, diameter of the base, etc, in some embodiments the difference between the base's coefficient of thermal expansion and the layer's coefficient of thermal expansion may be at least 40% but not more than 80% of the base's coefficient of thermal expansion. If the difference in the coefficients of thermal expansion is too small, the layer may not separate from the base.

As used herein, the "amount of layer that separates from the base" is calculated as a percentage of the proppant's surface area. This calculation may utilize an optical or electron microscopy technique to determine the amount of the proppant's surface area not covered by the layer. The layer may be described as separating from the proppant if the base can be seen using an optical technique. In one scenario, essentially all (e.g. 100%) of the layer is removed from the base. In other embodiments, the amount of layer removed may be no more than 25%, 50% or 75% of the proppant's surface area. The layer material that separates from the base should be removed from the proppant prior to using a plurality of proppant in a downhole application.

In contrast to using the processes described above to form a high strength proppant prior to inserting the proppant into a geological formation, the crush resistance of the proppant may be increased after insertion of the proppant in the fissures by utilizing the geological formation's geothermal heat to increase the temperature of the proppants after they have been mixed with a liquid and inserted into the fissures. In some embodiments, this process may utilize differences in the coefficients of thermal expansion of the proppant's base and layer to create a net compressive force. When proppants are inserted into geological formations, the ambient temperature within the formation may exceed 50° C. and commonly exceeds 75° C. Proppants that have an layer with a coefficient of thermal expansion greater than the base's coefficient of thermal expansion attain a net compressive force as the layer responds to the increase in temperature by trying to pull away form the base which has a lower coefficient of thermal expansion and therefore expands less than the layer. Because the base and layer are bonded to one another, the base restrains the movement of the layer thereby exerting a compressive force on the layer.

The steps of forming a high strength proppant after insertion into the fissures of a formation are disclosed in FIG. 9. Step 120 represents mixing a quantity of proppant having a sintered base and a sintered layer disposed on the sintered base with a liquid thereby forming a mixture. The base exerts an initial force on the layer. Step 122 represents forcing the mixture under pressure into the fissures in the formation. Step 124 represents utilizing the formation's geothermal heat to increase the temperature of the proppants which causes the exertion of a net compressive force on the layer. The net compressive force exceeds the initial force. The advantages of using a quantity of proppants as described herein may be best realized if 100 weight percent of the proppants have the features claimed below. However, some advantage may be realized if only 5 weight percent of the population of proppants has the desired features. In one embodiment, at least 50 weight percent of the population of proppants may have the desired features. In a second embodiment, at least 90 weight percent of the population of proppants may have the desired features.

Examples

Lots A, B, C, and D

To demonstrate the impact of particle size on the crush resistance of the invention described above, four lots of proppants, identified below as lots A, B, C, and D, were manufactured and evaluated for resistance to crushing. The lots were made by providing a quantity of commercially available bauxite that was ground to a mean particle size of approximately 6 microns and is identified herein as "coarse" material. A portion of the coarse material was then ground to a mean particle size below 2 microns and is identified herein as "fine" material. Table 1 shows the compositions of the base and layer for each of the four lots.

TABLE 1

|  |  | Base Material | |
|---|---|---|---|
|  |  | Coarse | Fine |
| Layer Material | Coarse | Lot A | Lot B |
|  | Fine | Lot C | Lot D |

Each lot of proppants was made by forming a spherically shaped base that was then coated with a layer thereby forming a composite. The bases were made using a "wet forming" method that will now be described. First, a quantity of the base material and a drilling starch binder were disposed into an Eirich mixer and dry mixed for 30 seconds. Water was then added over a 30 second period as the mixer continued to rotate and spheres of base material were formed. After approximately four minutes of mixing the base material, binder and water, the layer material was slowly added to the mass of rotating spherically shaped bases by sprinkling (also known as "dusting in") the layer material on top of the bases as they were moving in the mixer. All lots were then sintered at 1425° C. After forming and sintering all lots had a standard 20/40 size distribution. The strength of each lot was then evaluated using a CAMSIZER by Horiba to determine the percent crush at 700 kg/cm$^2$. As used herein, the term "percent crush" refers to the weight percent of the crushed quantity of proppant that flowed through a 40 mesh screen. Shown in Table 2 are the results of the crush testing.

TABLE 2

|  |  | Base Material | |
|---|---|---|---|
|  |  | Coarse | Fine |
| Layer Material | Coarse | Lot A 4.3% | Lot B 12.6% |
|  | Fine | Lot C 2.6% | Lot D 4.2% |

The data clearly demonstrates that the lowest weight percent crush was provided by lot C which was made from a coarse base material and a fine layer material. The reason lot C had the best resistance to crushing, as evidenced by the lowest weight percent crush, is believed to be due to the difference in shrinkage rates between the base material and the layer material. During the final stage of sintering, the coarse base material shrunk at a faster rate than the layer material. Since the base and layer are inherently bonded to one another during the sintering process, the difference in the rate of linear contraction during the final stage of sintering resulted in the base exerting a compressive force on the layer which lead to the proppant having improved resistance to crushing.

Figure 10:
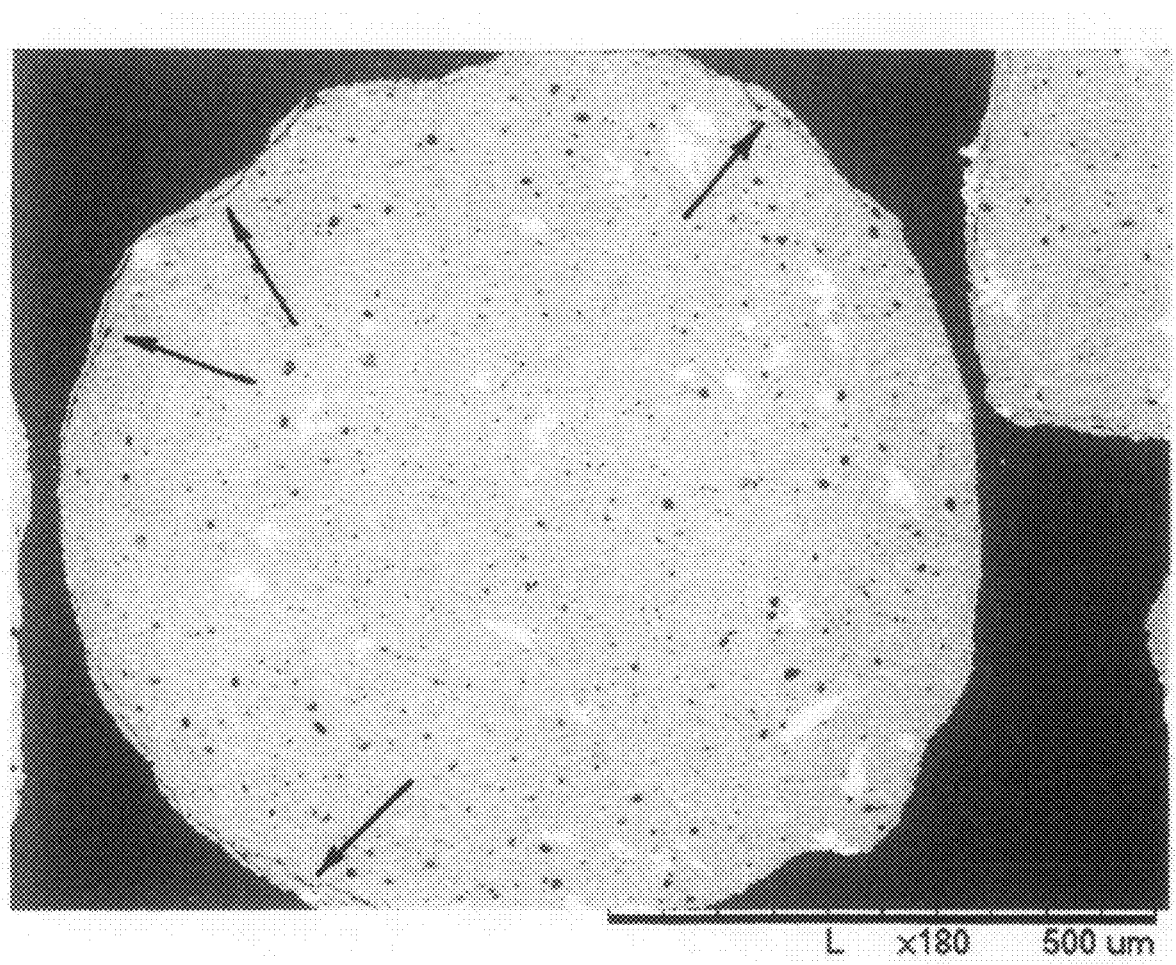
FIG. 10 is a photograph, magnified approximately 180 times, of a proppant for comparison to a proppant of this invention.

In contrast, lot B had the poorest resistance to crushing as evidenced by the highest weight percent crush (i.e. 12.6%). The proppants in lot B were made with a fine base material and coarse layer material. During the final stage of the sintering process, the coarse layer material continued to shrink after the fine base material has stopped shrinking. Consequently, the coarse layer was in tension which caused the layer to crack. Evidence of the cracking can be seen in FIG. 10 which is a scanning electron micrograph at 180× magnification of a cross-section of a proppant from lot B. The arrows point out the circumferential cracks that extend around the perimeter of the proppant in the layer material. The photograph confirms that the base was not protected by a layer in compression which reduced the strength of the proppant. The fractured layer crumbled easily during the crush test which lead to the high weight percent crush test results.

Examples

Lots E, F, G and H

Lots E, F, G and H were manufactured and crush tested to provide another illustration of how to improve the crush resistance of a proppant by creating a compressive force on the proppant's layer material. The lots were made from either a first bauxite material identified herein as material M1, a second bauxite material identified herein as material M2, or a combination of M1 and M2. The M1 material had a two step sintering curve. With reference to the part numbers shown in FIG. 1, the first step may be characterized as having point 26 equal to 1,033° C., point 28 equal to 1,175° C., and point 32 equal to 1,117° C. The first step's shrinkage was 2.0% and the thermal offset was 1150° C. The thermal offset may be described as an intercept between tangents drawn through point 32 and point 28. The second step of material M1 may be characterized as having point 26 equal to 1,213° C., point 28 equal to 1,560° C., and point 32 equal to 1,385° C. The second step's shrinkage was 24% and the thermal offset was 1,493° C. The coefficient of thermal expansion (CTE) of material M1 was 7.3×10$^{-6}$/° C. The M2 material had a single step sintering curve. With reference again to FIG. 1, the M2 material's sintering step may be characterized as having point 26 equal to 1,162° C., point 28 greater than 1,560° C., and point 32 equal to 1,443° C. The shrinkage was 25.3% and the thermal offset was 1,523° C. The CTE of material M2 was 8.9×10$^{-6}$/° C. which was larger than the coefficient of thermal expansion of material M1. In the final sintering stage, the rate of linear contraction in M2 was higher than that in the M1 material. After forming and sintering all lots had a standard 20/40 size distribution. Table 3 shows the combinations of base material and layer material for the three lots.

TABLE 3

|  |  | Base Material | |
|---|---|---|---|
|  |  | M1 | M2 |
| Layer Material | M1 | Lot E | Lot F |
|  | M2 | Lot G | Lot H |

Lots E, F, G and H were manufactured as follows. The dry base material and binder were placed into an Eirich mixer and mixed for 30 seconds. During the next 30 seconds water was added. As the mixer continued to rotate, spheres of base material were formed. After approximately four minutes of total mixing, a small amount of base material was added to the damp spheres to dry the bases. The mixer was then stopped. For lots F and G, the formed bases were removed and the mixer's pan and rotor were cleaned. The cleaning step minimized the mixing of M1 and M2 which could have formed an undesirable intermediate mixture of the two materials on the surface of the base at the interface of the base and proppant. The formed bases in lots F and G were then separately returned to the cleaned mixer for further processing. With regard to lots E and H, there was no need to remove the bases and clean the mixer because only M1 material was used to make lot E and only M2 was used to make lot H. After the loading of each lot of bases, the mixer was restarted using only the pan motion. The rotor was not moving. Layer material was added by sprinkling the same on top of the rotating bases. All lots were then sintered at 1450° C. The strength of each lot was then evaluated by determining the percent crush at 700 kg/cm². Shown in Table 4 are the results of the crush testing.

TABLE 4

| | | Base Material | |
|---|---|---|---|
| | | M1 | M2 |
| Layer Material | M1 | Lot E 9.3% | Lot F 5.8% |
| | M2 | Lot G 7.2% | Lot H 16.6% |

The data supports the conclusion that lot F had the lowest percent crush. There are believed to be two reasons for lot F's low percent crush. First, during the final stage of sintering, the rate of linear contraction of the base material was higher than the layer material's. The difference between those two rates during the final stage of sintering caused the layer to sinter in compression. The second reason is due to the difference in the base material's coefficient of thermal expansion and the layer material's coefficient of thermal expansion. Because lot F's base material was M2 which had a higher coefficient of thermal expansion than the layer material, the base shrunk more than the layer during the thermal cool down portion of the thermal cycle. The result was that the base exerted a compressive force on the layer which improved the proppant's ability to resist crushing.

In contrast, lot G was made with M1 as the base material and M2 as the layer material. Lot G was weaker and had a higher weight percent crush. There are two reasons for lot G's low percent crush. First, during the final stage of sintering, the base material shrunk slower than the layer material due to the difference in shrinkage rates between the two materials. The difference in shrinkage rates during the final stage of sintering caused the layer to sinter in tension and the base in compression. The compression upon the base enabled a greater degree of densification of the base than the layer. Second, the layer material (i.e. the M2 material) had a higher coefficient of thermal expansion than the base material (i.e. the M1 material). The layer material responded to the cooling by shrinking more than the base. Consequently, the layer was in tension rather than compression while the base was in compression rather than tension which was in contrast to Lot F. Sintered ceramic materials that are in tension may fracture at lower pressure than the same sintered ceramic materials that are in compression. Because of the extent of the sintering and thermal expansion differences between the base and layer, the layer experiences tension forces sufficient for separation from the base such that Lot G had very little layer material on the M2 material and, thus, was essentially an M1 material. The crush resistance of Lot G was better than Lot E because the base made from M1 experienced compression forces during sintering which improved the densification of the base material. An earlier evaluation of a proppant made with M2 as the layer and M1 as the base but without cleaning the mixer of M1 prior to using M2 showed a crush resistance of 24.4%. This much higher crush resistance occurred due to the difference in processing steps. Not changing the mixer allowed a formation of intermediate layer between M1 and M2 material that improved adhesion of M2 material to the surface of the M1 base. Despite this improvement in adhesion high tension forces present in n the M2 layer were sufficient to weaken the proppant.

Proppants of this invention may be modified to improve their performance in certain down hole applications. For example, the proppants may be screened to achieve a desirable particle size distribution as disclosed in U.S. Pat. No. 6,780,804 or coated with a polymeric material. Further modifications of the invention may occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

We claim:

1. A spherically shaped ceramic element comprising a sintered base secured to a sintered layer, said base has a coefficient of thermal expansion, said layer has a coefficient of thermal expansion, said base's coefficient of thermal expansion exceeds said layer's coefficient of thermal expansion and said base exerts a compressive force on said layer.

2. The ceramic element of claim 1 wherein the difference between said base's coefficient of thermal expansion and said layer's coefficient of thermal expansion is at least 1% but not more than 40% of the base's coefficient of thermal expansion.

3. The ceramic element of claim 1 wherein the difference between said base's coefficient of thermal expansion and said layer's coefficient of thermal expansion is at least 5% but not more than 30% of the base's coefficient of thermal expansion.

4. The ceramic element of claim 1 wherein said layer encapsulates said base.

5. The ceramic element of claim 1 wherein said base comprises at least one sintered material selected from the group consisting of alumina, titania, silica, magnesia, mullite, talc, forsterite, iron oxide, clay, bauxite and aluminosilicates.

6. The ceramic element of claim 1 wherein said base has an average particle size, said layer has an average particle size, and wherein said base's average particle size exceeds said layer's average particle size.

7. The ceramic element of claim 1 wherein said layer comprises one or more openings therethrough thereby forming a discontinuous layer on said base.

8. The ceramic element of claim 1 wherein said layer and said base each comprise a metal oxide.

9. The ceramic element of claim 8 wherein said ceramic element comprises alumina.

10. The ceramic element of claim 1 wherein said layer comprises alumina.

11. The ceramic element of claim 1 wherein said base comprises alumina.

12. The ceramic element of claim 1 wherein said base and said layer each comprise alumina.

13. The ceramic element of claim 1 wherein said proppant has an average radius and the thickness of said layer is between 5% and 50% of the proppant's average radius.

14. The ceramic element of claim 1 wherein said proppant has an average radius and the thickness of said layer is between 10% and 25% of the proppant's average radius.

* * * * *